(12) United States Patent  
Six et al.

(10) Patent No.: US 9,167,201 B2  
(45) Date of Patent: Oct. 20, 2015

(54) FEEDBACK-SYSTEM FOR MANAGING VIDEO CONFERENCING WITH A PORTABLE MULTIMEDIA DEVICE COMPRISING A FRONTAL CAMERA

(71) Applicants: Erwin Alfons Constant Six, Kalken (BE); Sammy Lievens, Brasschaat (BE); Maarten Aerts, Beveren-Waas (BE); Donny G. Tytgat, Sint-Amandsberg (BE)

(72) Inventors: Erwin Alfons Constant Six, Kalken (BE); Sammy Lievens, Brasschaat (BE); Maarten Aerts, Beveren-Waas (BE); Donny G. Tytgat, Sint-Amandsberg (BE)

(73) Assignee: Alcatel Lucent, Boulogne-Billancourt (FR)

( * ) Notice: Subject to any disclaimer, the term of this patent is extended or adjusted under 35 U.S.C. 154(b) by 20 days.

(21) Appl. No.: 13/911,325

(22) Filed: Jun. 6, 2013

(65) Prior Publication Data

US 2014/0015918 A1    Jan. 16, 2014

(30) Foreign Application Priority Data

Jun. 7, 2012  (EP) .................................. 12305647

(51) Int. Cl.  
*H04N 7/14*  (2006.01)

(52) U.S. Cl.  
CPC .................................... *H04N 7/144* (2013.01)

(58) Field of Classification Search  
CPC .......... H04N 7/144; H04N 7/14; H04N 7/141; H04N 7/142; H04N 7/15  
USPC ............................................ 348/14.01–14.16  
See application file for complete search history.

(56) References Cited

U.S. PATENT DOCUMENTS

| | | | |
|---|---|---|---|
| 6,373,516 B1 * | 4/2002 | Kim ........................... | 348/14.01 |
| 7,167,195 B2 * | 1/2007 | Kimata et al. ............. | 348/14.16 |
| 8,405,706 B2 * | 3/2013 | Zhang et al. ............... | 348/14.16 |
| 2002/0101512 A1 * | 8/2002 | Klapman et al. ............. | 348/207 |
| 2010/0079449 A1 | 4/2010 | McCarthy | |

FOREIGN PATENT DOCUMENTS

WO     WO 03/034729 A1    4/2003  
WO     WO 2011/133842 A1   10/2011

OTHER PUBLICATIONS

International Search Report for European Application No. 12305647.5 dated Nov. 8, 2012.

* cited by examiner

*Primary Examiner* — Melur Ramakrishnaiah  
(74) *Attorney, Agent, or Firm* — Fay Sharpe LLP

(57) ABSTRACT

A feedback-system for managing the position of a frontal camera provided on a portable multimedia device during video communication. The feedback-system comprises a camera image analyzer coupled to the frontal camera and adapted to detect and analyze the pose of a user facing the frontal camera, an optimal video estimator coupled to the camera image analyzer and adapted to calculate a 6-dimensional error-vector of the current position of the frontal camera with respect to an optimal position of the frontal camera, an intuitive feedback manager coupled to the optimal video estimator and adapted to generate a transformation matrix translating the error-vector into an error message for the image displayed on a screen of the portable multimedia device, the intuitive feedback manager being further coupled to the portable multimedia device which is adapted to use the error message for modifying the image displayed on the screen.

12 Claims, 2 Drawing Sheets

FEEDBACK-SYSTEM FOR MANAGING VIDEO CONFERENCING WITH A PORTABLE MULTIMEDIA DEVICE COMPRISING A FRONTAL CAMERA

The present invention relates to a feedback-system for managing during video communication the position of a frontal camera provided on a portable multimedia device.

Such a feedback-system is related to the problem that video conferencing with a portable multimedia device such as a tablet PC, a smartphone or even a normal Laptop is very difficult due to the fact that the portable multimedia device is mobile and therefore having a good consistent camera-shot of the user in front of the tablet/phone is difficult. The reason is that the user is not always fully in view or is filming himself from a wrong perspective because he/she is not holding the portable multimedia device high enough, etc . . .

A partial solution for improving the image quality of a mobile frontal camera is to perform image stabilization by removing small/quick camera movements.

Another possible solution is to perform virtual face-cropping of the captured camera-shot.

However, both these possible solutions don't solve the problem that from time to time the user still goes outside the captured viewport of the frontal camera of his portable multimedia device and neither of them solves the problem of capturing an image of the user from a wrong perspective.

Another option is to continuously show a copy of his own camera-feed on the screen portable multimedia device, e.g. by picture-in-picture PiP, such that the user can see how he/she is positioned in front of the camera.

This doesn't work well with relatively small mobile/portable devices or with devices where the viewing-angle on the user is very small. The reason therefore is that portable multimedia device is moved or repositioned a lot during a video communication, e.g. of about 30 minutes. For instance, a tablet is held differently during a conversation and the screen of a laptop, with its integrated frontal camera, is in practice moved a lot during a video communication, e.g. a video conference or meeting. A frontal camera very close to the user and with a small viewing angle also needs to be repositioned regularly because of changes in the pose of the user.

As a consequence, the user needs to spend quite some time during the video conversation to look at his own image to check whether he is still captured correctly. This results in a high cognitive load for the user and therefore the immersive experience of the video conference becomes quiet low.

A possible improvement is to incorporate some kind of panoramic frontal camera or Pan-Tilt-Zoom frontal camera in the portable multimedia device.

However, this solution is expensive and generally not desired.

An object of the present invention is to provide a feedback-system of the above known type but wherein the management of position of the frontal camera is improved while disturbing as less as possible the user of the portable multimedia device.

According to a characterizing embodiment of the invention, this object is achieved due to the fact that said feedback-system comprises a camera image analyzer coupled to said frontal camera and adapted to detect and analyze the pose of a user facing said frontal camera, an optimal video estimator coupled to said camera image analyzer and adapted to calculate an error-vector of the current position of said frontal camera with respect to an optimal position of said frontal camera, an intuitive feedback manager coupled to said optimal video estimator and adapted to translate said error-vector into an error message for the image displayed on a screen of said portable multimedia device, said intuitive feedback manager being further coupled to said portable multimedia device which is adapted to use said error message for modifying the image displayed on said screen.

In this way, the feedback-system analyses the image itself, and thereby reduces the cognitive load of the user to look continuously to his own image.

The image displayed on the screen is modified in such a way that the user sub-consciously corrects the position of the portable multimedia device and thereby the position of the frontal camera.

Another characterizing embodiment of the present invention is that said feedback-system further comprises a display controller coupled to said intuitive feedback manager and adapted to receive said error message and to modify the image on said screen by displaying instructions corresponding to said error message.

The instructions displayed on the screen, preferably under the form of arrows, are intended to help the user to manage the position of the frontal camera by holding the portable multimedia device differently.

In a preferred characterizing embodiment of the present invention, said feedback-system further comprises a display controller coupled to said intuitive feedback manager and adapted to receive said error message and to accordingly modify the perspective of the image displayed on said screen.

By modifying the perspective of the image displayed on the screen, the feedback-system intuitively instructs the user on how to correctly hold the frontal camera. As a result, a much better user-experience is achieved because, e.g., the user don't have to watch all the time his own image or following instructions on screen.

Also another characterizing embodiment of the present invention is that said user intuitively modifies either the position of said portable multimedia device or his own position with respect to said portable multimedia device, or both, for correcting the perspective of the image displayed on said screen.

By modify at least one of these positions, the user intuitively corrects and optimizes the image captured by the frontal camera.

Further characterizing embodiments of the present feedback-system are mentioned in the appended claims.

It is to be noticed that the terms "comprising" or "including", used in the claims, should not be interpreted as being restricted to the means listed thereafter. Thus, the scope of an expression such as "a device comprising means A and B" should not be limited to an embodiment of a device consisting only of the means A and B. It means that, with respect to embodiments of the present invention, A and B are essential means of the device.

Similarly, it is to be noticed that the term "coupled", also used in the claims, should not be interpreted as being restricted to direct connections only. Thus, the scope of the expression such as "a device A coupled to a device B" should not be limited to embodiments of a device wherein an output of device A is directly connected to an input of device B. It means that there may exist a path between an output of A and an input of B, which path may include other devices or means.

The above and other objects and features of the invention will become more apparent and the invention itself will be best understood by referring to the following description of an embodiment taken in conjunction with the accompanying drawings wherein.

Figure 1:
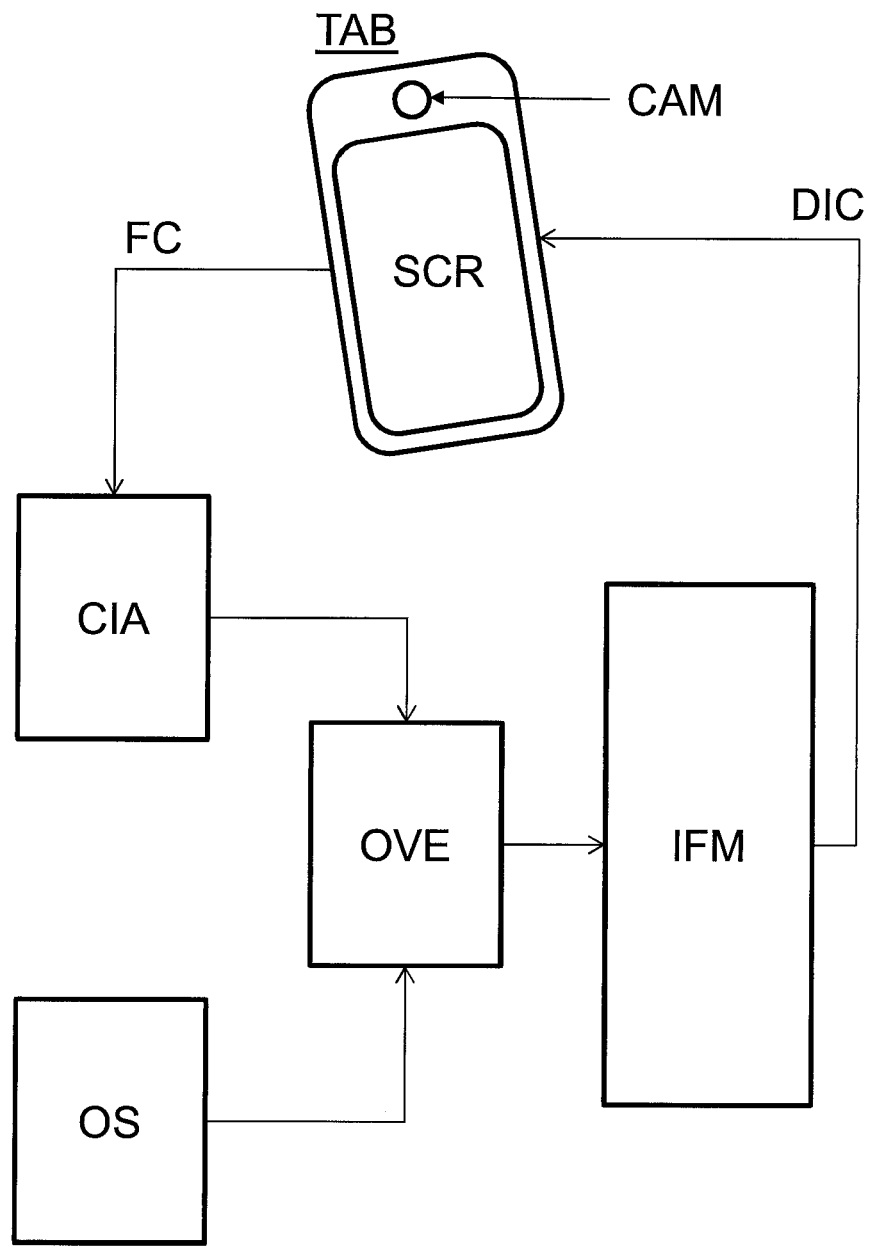
FIG. 1 represents the structure of the feedback-system according to the present invention comprising a frontal camera CAM provided on a portable multimedia device TAB.

A portable multimedia device TAB, such as a tablet PC, a smartphone or even a normal Laptop, is represented at FIG. 1. The portable multimedia device TAB is provided with a screen SCR and with a frontal camera CAM able to take a video image of the user using the device. The frontal camera CAM can for instance be used for video communication.

Correct positioning or calibrating of the frontal camera CAM to a certain scene, generally to the face of the user, is a difficult problem with 6 degrees of freedom: x y z and 3 rotation directions. Therefore, in order to stabilize such a hand-held frontal camera of, e.g., a tablet without the user having to see himself the whole time as with the picture-in-picture PiP display, it is possible to give feedback instructions to the user on how to hold his camera based on arrows displayed on the screen SCR or by voice commands such as "please move your device: left, right, up down, back, forth, role left, role right, tilt up, tilt down, . . .". The instructions are intended to help the user to manage the position of the frontal camera by holding the portable multimedia device differently with a minimum of cognitive load.

However, although this solution requires less cognitive load for doing the eye-hand coordination than for instance the picture-in-picture PiP display where the user can see how he is positioned in front of the frontal camera and correct his position accordingly, it can be improved as will be explained below.

Humans are intuitively very well trained in eye-hand coordination to stabilize things with 6 degrees of freedom, like holding a glass of water while walking.

Based thereon, an intuitive feedback-system has been created which changes the perspective of everything displayed on the screen SCR of the tablet or smartphone, subject to how the user is viewed and automatically detected by the frontal camera CAM. As such, it becomes a stabilization problem for the user's motoric-system that a human can perform without too much cognitive load on his brain.

Figure 2A:
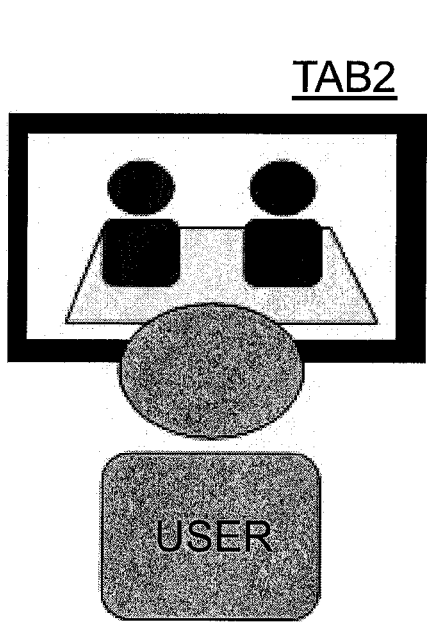
FIGS. 2A and 2B show an embodiment of the feedback-system of FIG. 1 in a 3D virtual conference environment.
Figure 2B:
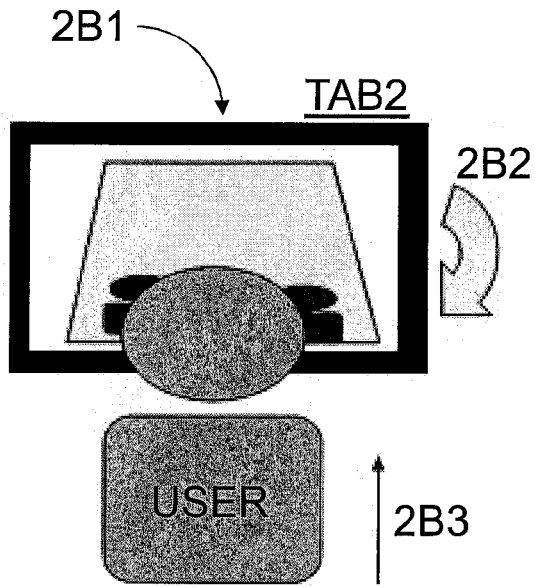
Figure 3A:
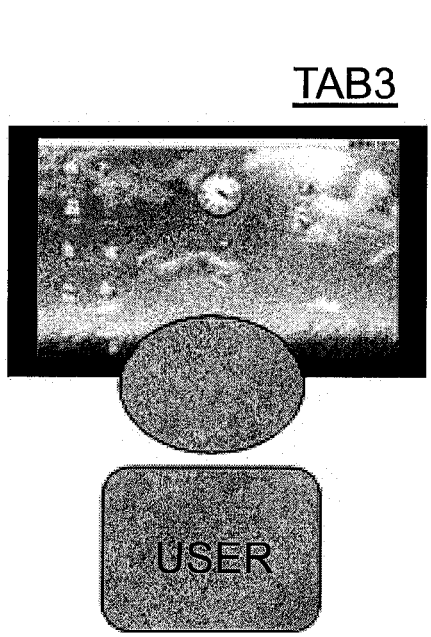
FIGS. 3A and 3B show another embodiment of the feedback-system of FIG. 1 in a 2D full-screen homography.
Figure 3B:
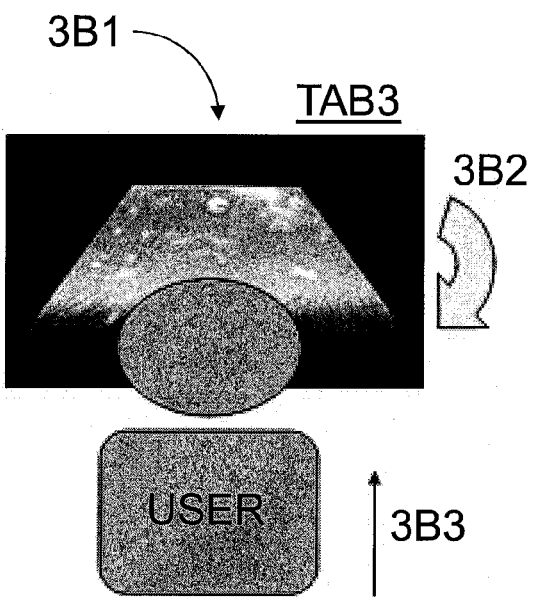

There are two types of perspective changes which can be handled very intuitively by an end-user: one for 3D applications as shown at FIGS. 2A and 2B, and one for 2D applications as shown at FIGS. 3A and 3B.

When the user of a 3D environment is correctly positioned with respect to the frontal camera CAM, a picture like the one shown on TAB2 of FIG. 2A appears.

However, when the position is not correct, the perspective changes as indicated by 2B1 at FIG. 2B. The screen of TAB2 shows a content of the 3D environment with perspective changes 2B1 that the user can manipulate. The perspective changes 2B1 shown on that screen are opposite to the direction the user needs to rotate/translate the frontal camera. The user intuitively modifies 2B2 the position of the portable multimedia device TAB2 for correcting the perspective of the image displayed on the screen. Alternatively or complementarily, the user can also intuitively modify 2B3 his own position by moving with respect to the portable multimedia device TAB2 for correcting the perspective of the image displayed on the screen of TAB2.

Similarly, when the user of a 2D application is correctly positioned with respect to the frontal camera CAM, a picture like the one shown on TAB3 of FIG. 3A appears.

However, when the position is not correct, a deformation 3B1 of the 2D projection content on the screen of TAB3 is created as shown at FIG. 3B. By trying to maximize the viewport on the rectangular screen of TAB3, the user intuitively optimizes the capturing position of the frontal camera. Here again, the user can modify 3B2 the position of the portable multimedia device TAB3 for correcting (maximizing) the image displayed on the screen. Alternatively or complementarily, the user can also modify 3B3 his own position by moving with respect to the portable multimedia device TAB3.

For both the 3D and 2D environments/applications, the full screen of the portable multimedia device TAB can also be transformed to a homography representing the opposite rotation direction in 3D. The user will then sub-consciously correct the homography such that it will become again a full-screen rectangle using all of the pixels. As such the user will remain better in view of the camera.

In order to achieve the above, a feedback-system is provided which analyses the image itself, and thereby reduces even more the cognitive load of the user. Furthermore, as already mentioned, the feedback-system is intended to intuitively instruct the user on how to hold his camera differently.

An implementation of a feedback-system for managing during video communication or videoconferencing the position of the portable camera or frontal camera CAM provided on the portable multimedia device TAB is described in more detail below by making reference to FIG. 1.

Video is captured by the frontal camera CAM and, while the feed is forwarded into the network, the feedback-system creates a control-loop with what is displayed on the screen SCR. As such, a stabilization mechanism is created which will ensure a very good captured video by the frontal camera CAM.

To this end, first the pose or position of the person seen by the frontal camera CAM is transmitted to a camera image analyzer CIA to which the frontal camera CAM is coupled FC. The camera image analyzer CIA detects and analyzes the pose of the user facing the frontal camera CAM. This analysis is based on pose tracking by pose detectors, optical flow algorithms and/or feature point analysis.

The camera image analyzer CIA is coupled to an optimal video estimator OVE to which the results of the analysis are transmitted. Other information, provided by other sensors OS like gyroscope, accelerometers and/or proximity sensors may also be transmitted to the optimal video estimator OVE.

Based on the results or data from the camera image analyzer CIA and optionally from the other sensors OS, the optimal video estimator OVE estimates or calculates an error-vector, preferably a 6-dimensional error-vector with 3 x-y-z translations errors and 3 rotation errors, of how the frontal camera CAM is currently held, compared to how this frontal camera should be optimally held or positioned.

The optimal video estimator OVE is coupled to an intuitive feedback manager IFM to which the 6-dimensional error-vector is transmitted. The intuitive feedback manager IFM transforms the 6-dimensional error-vector with a transformation matrix, preferably a 6×6 transformation matrix, thereby translating the error in the frontal camera position towards an error message in the optimal visualization on the screen, e.g. an error on virtual camera or an error message on the homography of the displayed 2D or 3D content. The transformation matrix is as such that given the error-vector this matrix maximally facilitates the user to re-stabilize his view. So, the exact figures in this matrix will be learned from a large amount of user-tests in order to see how sensitive users are in correcting errors.

The output or error message of the intuitive feedback manager IFM is transferred to a display controller (not shown) of the portable multimedia device TAB as display information control DIC. The display controller uses the error message for modifying the display of the image viewed by the user on the screen SCR of the portable multimedia device TAB. The display controller can either modify the image on the screen SCR by displaying instructions, e.g. arrows, corresponding to the error message, or modify the perspective of the image displayed on the screen SCR, or both.

As a result, the user sub-consciously corrects the position of the portable multimedia device TAB compared to him thereby correcting and optimizing his position with respect to the frontal camera CAM, as explained above. In other words, the feedback-system intuitively instructs or manages the user on how to correctly hold the frontal camera CAM.

The feedback-system analyzes the images of the build-in frontal camera CAM on various levels:
- pose of the user in front of the frontal camera CAM, e.g. head tracking, silhouette tracking, . . .
- typical motion of the user in front of the frontal camera CAM, e.g. statistical analysis of optical flow over time, . . .
- estimate extrinsic parameters of the frontal camera CAM, e.g. 3 angles of orientation of the frontal camera by feature tracking, . . .
- and optionally use information from gyroscopes or other sensors OS, e.g. proximity, . . .

Based on all these inputs the feedback-system decides what the offset is between the current position of the frontal camera CAM and the optimal position of this camera, and how the tablet should be moved in order to accomplish this within the 6 degrees of freedom of the frontal camera CAM.

Finally, the intuitive feedback-system gives this information back to the user, such that the user sub-consciously corrects the position of the portable multimedia device TAB compared to him, or corrects his own position compared to the portable multimedia device TAB.

If, in an embodiment of 3D virtual conference room, the user is correctly in view of the frontal camera of his portable multimedia device TAB2, the most perfect view is presented on the display or screen of TAB2 as shown at FIG. 2A.

If however the user tilts the frontal camera in a position where he is no longer in view of the frontal camera, as shown at FIG. 2B, accordingly the virtual camera on the 3D environment visualized on the display will change 2B1 as well. As a consequence, the user will intuitively stabilize his display and unconsciously correct 2B2/2B3 the position of the frontal camera back so that he is perfectly in view again. His view on the screen of the portable multimedia device TAB2 will then be again as in FIG. 2A.

If, in an embodiment of homography of 2D full-screen, the user is correctly in view of the frontal camera of his portable multimedia device TAB3, the most perfect view is presented on the display or screen of TAB3 as shown at FIG. 3k, i.e. the maximal use of the screen area of the portable multimedia device TAB3.

If however the user tilts the frontal camera in a position where he is no longer in view of the frontal camera, as shown at FIG. 3B, the display space will be rescaled by an homography which represents 3B1 a perspective projection of the 2D screen somewhere in a 3D space. As a consequence, the user will intuitively stabilize (rotate and/or move) his portable multimedia device TAB3 and unconsciously correct 3B2/3B3 the position of the frontal camera back so that he is perfectly in view again. His view on the screen of the portable multimedia device TAB3 will then be again as in FIG. 3A.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A feedback-system for managing during video communication the position of a frontal camera provided on a portable multimedia device,
wherein said feedback-system comprises
a camera image analyzer coupled to said frontal camera and adapted to detect and analyze the pose of a user facing said frontal camera,
an optimal video estimator coupled to said camera image analyzer and adapted to calculate an error-vector of the current position of said frontal camera with respect to an optimal position of said frontal camera,
an intuitive feedback manager coupled to said optimal video estimator and adapted to translate said error-vector into an error message for the image displayed on a screen of said portable multimedia device, said intuitive feedback manager being further coupled to said portable multimedia device which is adapted to use said error message for modifying the image displayed on said screen.

2. The feedback-system according to claim 1, wherein said feedback-system further comprises a display controller coupled to said intuitive feedback manager and adapted to receive said error message and to modify the image on said screen by displaying instructions corresponding to said error message.

3. The feedback-system according to claim 2, wherein said instructions are displayed under the form of arrows on said screen.

4. The feedback-system according to claim 2, said user manages the position of said frontal camera by modifying the position of said portable multimedia device.

5. The feedback-system according to claim 2, wherein said user manages the position of said frontal camera by modifying his position with respect to said portable multimedia device.

6. The feedback-system according to claim 1, wherein said feedback-system further comprises a display controller coupled to said intuitive feedback manager and adapted to receive said error message and to accordingly modify the perspective of the image displayed on said screen.

7. The feedback-system according to claim 6, wherein said user intuitively modifies the position of said portable multimedia device for correcting the perspective of the image displayed on said screen.

8. The feedback-system according to claim 6, wherein said user intuitively modifies his position with respect to said portable multimedia device for correcting the perspective of the image displayed on said screen.

9. The feedback-system according to claim 1, wherein said camera image analyzer is adapted to detect and analyze the pose of said user facing said frontal camera based on pose tracking by pose detectors, optical flow algorithms and/or feature point analysis.

10. The feedback-system according to claim 1,
wherein said optimal video estimator is adapted to calculate an error-vector of the current position of said frontal camera with respect to an optimal position of said frontal camera,
and in that said intuitive feedback manager is adapted to translate said error-vector into an error message by transforming said error-vector with a transformation matrix.

11. The feedback-system according to claim 10, wherein said error-vector is a 6-dimensional error-vector comprising 3 x-y-z translations errors and 3 rotations errors.

12. The feedback-system according to claim 10, said optimal video estimator is further coupled to other sensors such as gyroscope, accelerometers and/or proximity sensors in order to calculate said error-vector.

* * * * *